United States Patent
Betts

(10) Patent No.: US 6,823,002 B1
(45) Date of Patent: Nov. 23, 2004

(54) LINEAR BLOCK INTERLEAVER FOR DISCRETE MULTI-TONE MODULATION

(75) Inventor: William L. Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 729 days.

(21) Appl. No.: 09/737,256

(22) Filed: Dec. 13, 2000

Related U.S. Application Data

(60) Provisional application No. 60/170,804, filed on Dec. 15, 1999.

(51) Int. Cl.[7] .............................. H04B 1/38; H04L 5/16
(52) U.S. Cl. ...................................................... 375/219
(58) Field of Search ................................ 375/240, 219, 375/211, 220

(56) References Cited

U.S. PATENT DOCUMENTS

| | | | | |
|---|---|---|---|---|
| 5,596,604 A | * | 1/1997 | Cioffi et al. ................. | 375/260 |
| 5,933,431 A | | 8/1999 | Ko .............................. | 370/476 |
| 5,949,796 A | * | 9/1999 | Kumar ........................ | 370/529 |
| 5,983,388 A | * | 11/1999 | Friedman et al. ........... | 714/776 |
| 6,011,814 A | | 1/2000 | Martinez et al. ............ | 375/233 |
| 6,067,646 A | * | 5/2000 | Starr ........................... | 714/701 |
| 6,151,690 A | * | 11/2000 | Peeters ........................ | 714/701 |
| 6,496,545 B1 | * | 12/2002 | Liu .............................. | 375/301 |
| 6,625,219 B1 | * | 9/2003 | Stopler ........................ | 375/240.27 |
| 6,668,023 B1 | * | 12/2003 | Betts ........................... | 375/285 |

OTHER PUBLICATIONS

U.S. Utility Application entitled Fractional Bit Rate Encoding in a Discrete Multi-Tone Communication System; Unofficial Serial No. (from Postcard) 09/717,436; Inventor: William L. Betts; filed Nov. 20, 2000.

U.S. Utility Application entitled Linear Block Interleaver System and Method; Unofficial Serial No. (from Postcard) 09/073,103, Inventor: William L. Betts; filed May 5, 1998.

* cited by examiner

*Primary Examiner*—Stephen Chin
*Assistant Examiner*—Harry Vartanian
(74) *Attorney, Agent, or Firm*—Thomas, Kayden, Horstemeyer & Risley, LLP

(57) ABSTRACT

A discrete multi-tone (DMT) digital subscriber line (DSL) communication device employs a linear block interleaver for mathematically combining multiple tones into n-tone combinations in order to efficiently suppress or eliminate correlated noise or impulse noise generated in the communication channel. In architecture, the linear block interleaver includes logic configured to combine multiple signaling constellations into n-tone combinations. The multiple constellations are mathematically combined such that noise energy present in at least one of the n-tone combinations is spread among each of the multiple tones, thus reducing the energy of the noise on each of the multiple tones.

19 Claims, 5 Drawing Sheets

LINEAR BLOCK INTERLEAVER FOR DISCRETE MULTI-TONE MODULATION

CROSS REFERENCE TO RELATED APPLICATION

This document claims priority to and the benefit of the filing date of copending and commonly assigned U.S. Provisional Patent Application entitled DISCRETE MULTI-TONE LINEAR BLOCK INTERLEAVER, assigned Ser. No. 60/170,804, and filed Dec. 15, 1999, hereby incorporated by reference.

TECHNICAL FIELD

The invention relates generally to data communications, and more particularly, to a linear block interleaver for suppressing impulse noise in a discrete multi-tone (DMT) communications environment.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modern communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office to the user, or remote location, typically referred to as the customer premises (CP). DSL communication devices use different formats and different types of modulation schemes and achieve widely varying communication rates. However, even the slowest DSL communications devices achieve data rates far in excess of conventional point-to-point modems.

Some of the available modulation schemes include quadrature-amplitude modulation (QAM), carrierless amplitude/phase (CAP) and DMT. In a DMT modulation scheme, a number of carriers, commonly referred to as "tones" are encoded with the information to be transmitted and communicated over the communications channel. This information, in the form of data words, is encoded into signal space constellations and then transmitted. In a typical DMT transmitter, 256 carrier tones are used to encode the data and are added together resulting in a very high peak signal power due to the high numerical peak resulting from the addition of the 256 tones. Power consumption is further increased due to the use of square signal space constellations used in conventional DMT transmitters and the allowed +2.5 dB to −14.5 dB power variation allowed on each carrier tone. Square signal space constellations have an inherently high peak signal power due to the location of the highest power signal point. The peak signal power in conventional DMT transmitters is sufficiently high to cause saturation or clipping of the transmitter in normal operation. Conventional DMT allows a probability of clipping of approximately $10^{-7}$. The number of bits encoded on each DMT carrier is selected in whole bit increments to bring the margin associated with each tone to within approximately 3 dB of the specified margin. Contributing to the peak power problem, the DMT modulation scheme allows the power on individual tones to be increased by up to approximately 2.5 dB to satisfy margin requirements. While increasing the power on some tones, the system reduces the power on other tones to maintain the specified transmit power. This scheme of tone power variation is useful in instances where it may be desirable to turn off specified tones and allocate their power to other tones. Unfortunately, this tone power variation results in spectrum management difficulties. Conventional DMT systems simply turn off specified tone carriers and increase others by the allowed 2.5 dB, but this results in the undesirable situation in which some carriers will be approximately 2.5 dB hotter than necessary in certain spectral bands, resulting in undesirable cross-talk, while other carrier tones are switched off completely. The tones at the high end of the frequency spectrum are frequently switched off.

Noise on individual DMT carrier tones and impulse noise cause major performance impairments to DSL modems. In systems that use DMT modulation, impulses are generated when the high peak power of the transmit signal saturates the digital-to-analog (DAC) in the transmitter, even prior to transmission. To combat this inherent deficiency, conventional DMT transmitters use expensive Reed-Solomon forward error correction encoders combined with bit-wise interleavers. Unfortunately, these coders introduce a significant amount of throughput delay.

Furthermore, noise is an ever present obstacle to optimal receiver performance. Noise imparted by the communication channel can be substantially eliminated through the use of well known techniques, such as precoding and channel equalization. Local noise imparted to a channel, such as periodic impulse noise, from local sources, such as electrical appliances and light dimmers, and random impulse noise, such as switching relays in a central office (CO), present an even greater problem that can degrade receiver performance.

All DSL equipment is susceptible to these impairments. In order to combat cross-talk, carrierless amplitude/phase (CAP) modulation uses a precoder, while discrete multi-tone (DMT) selectively disables the affected frequency bins, or tones. The 60 Hz periodic impulse noise (for example, that generated by a local electrical appliance such as a light dimmer) and other impulse noise generated for example by a switching relay at the central office is allowed to exist and the resulting errors are corrected by a Reed Solomon (RS) forward error correction code, sometimes in combination with a bit-wise interleaver. Unfortunately, as mentioned above, this solution adds throughput delay.

Other error correction codes are available which can be used to reduce some of the errors caused by impulse noise. For example, block codes, and more specifically, linear block codes have been developed for use in communications systems to correct or reduce the number of burst errors in data transmission. However, these codes have excess delay and have been unable to successfully reduce or eliminate the type of random impulse noise generated by relay switching equipment in a telephone company central office.

Therefore, it would be desirable to provide a noise suppression system and method in both a transmitter and a receiver of a DMT communication system to reduce or eliminate the impulse noise imparted to a receiver, without introducing throughput delay, and that eliminates the need for, but is compatible with, forward error correction.

SUMMARY OF THE INVENTION

The invention enables a communication device to efficiently suppress impulse noise. This noise can be for example, switching relay noise imparted to the communication channel at a telephone company central office or can be low frequency noise generated in the vicinity of a transceiver by, for example, a 60 Hz light dimmer.

The invention allows impulse noise to be eliminated from a transceiver employing DMT modulation by mathematically combining, or interleaving, a number of carrier tones and transmitting the combined energy of all the tones on each carrier tone. In this manner, impulse noise present on any one of the tones is spread among all the interleaved tones.

BRIEF DESCRIPTION OF THE DRAWINGS

The invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE INVENTION

Although described with particular reference to an asymmetric digital subscriber line (ADSL) communication system using DMT modulation, the linear block interleaver can be implemented in any communication system.

Furthermore, the linear block interleaver can be implemented in software, hardware, or a combination thereof. In a preferred embodiment, the elements of the invention are implemented in software that is stored in a memory and that configures and is executed by a suitable microprocessor ($\mu$P) or digital signal processor (DSP) situated in a communication device. The hardware portion of the invention can be implemented using specialized hardware logic. The software portion can be stored in a memory and be executed by a suitable instruction execution system (microprocessor). The hardware implementation of the linear block interleaver can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

Furthermore, the linear block interleaver software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic or electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
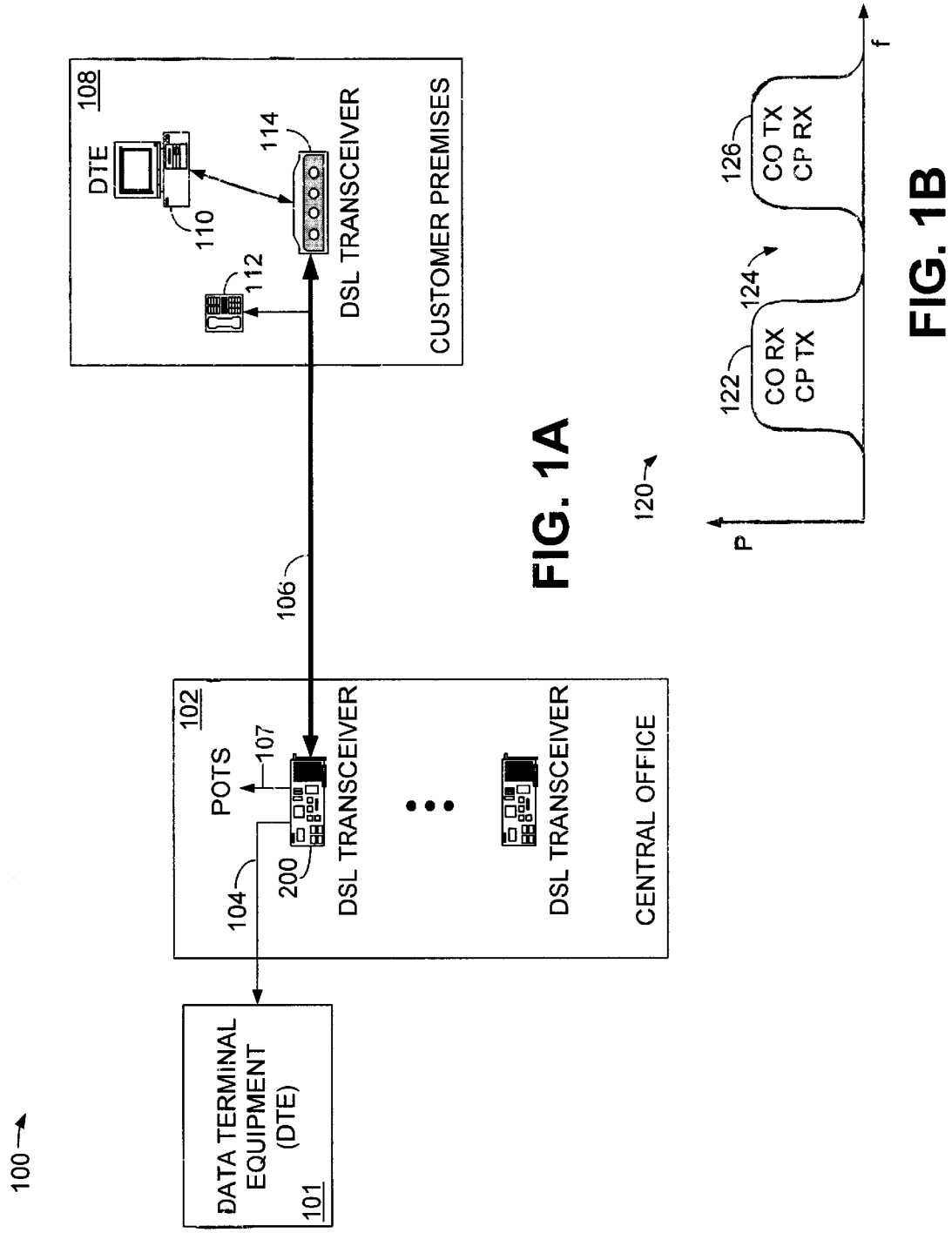
FIG. 1A is a block diagram illustrating an exemplar digital subscriber line communication environment in which the present invention resides.
FIG. 1B is a graphical representation illustrating the frequency spectrum of the communication that occurs between central office and customer premises of FIG. 1A.

Turning now to the drawings, FIG. 1A is a block diagram illustrating an exemplar digital subscriber line communication environment 100 in which the present invention resides. The DSL communication environment 100, for illustrative purposes only, is an asymmetric digital subscriber line (ADSL) communication environment. However, other DSL communication environments are contemplated by the invention. For example, the invention contemplates the use of symmetric DSL technologies such as high bit rate DSL (HDSL), symmetric DSL (SDSL), and multi-rate SDSL (MSDSL). Furthermore, the invention contemplates other asymmetric digital subscriber line technology such as rate adaptive DSL (RADSL).

Central office 102 connects to customer premises 108 via communication channel 106. Communication channel 106 can be the copper wire pair that typically extends between central office 102 and a remote customer location, and is commonly referred to as the "local loop," or "subscriber loop." For exemplar purposes only, the transmission scheme between central office 102 and customer premises 108 is point-to-point full duplex ADSL, using discreet multi-tone (DMT) line coding. Other communication schemes are possible between central office 102 and customer premises 108, such as variations of multi-point and half duplex.

Central office 102 includes a number of DSL transceivers, an exemplar of one of which is illustrated using reference numeral 200. DSL transceiver 200 exchanges information with data terminal equipment (DTE) 101 via connection 104 and interfaces to communication channel 106 in order to communicate with DSL transceiver 114 located at customer premises 108. DTE 101 can be, for example, a computer to which the DTE 110 in customer premises 108 is communicating, or can represent access to the Internet.

DSL transceiver 114 located at customer premises 108 connects to DTE 110 and plain old telephone service (POTS) device 112 connects directly to communication channel 106. Although omitted for clarity, a POTS splitter is typically installed between the communication channel 106 and POTS device 112 to prevent the POTS device 112 from interfering with the DSL communication and to prevent DSL signals from degrading POTS performance. DTE 110 can be a personal computer and POTS device 112 can be a typical telephone. Typically, the DSL transceiver 114 is located in a home or office, and is used to allow simultaneous data communication (using DTE 110) and voice communication (using POTS device 112).

DSL transceiver 114 communicates over communication channel 106 with DSL transceiver 200 in order to exchange data information. Simultaneously with the data, voice information is transmitted over communication channel 106 and separated by DSL transceiver 200 via connection 107 and sent to typical telephone company POTS switching equipment (not shown). Data is exchanged between customer premises 108 and central office 102 in order to allow DTE 110 to access, for example, DTE 101, which may be an Internet access device provided by an internet service provider (ISP).

Although illustrated using a single customer premises 108 connected to central office 102, typically a number of customer premises locations will be connected to one central office 102 using a plurality of communication channels. Furthermore, it is also possible for a number of customer premises locations to be connected to one DSL transceiver located at a central office. However, for purposes of explanation, the invention will be described with reference to a single customer premises 108 communicating with a single DSL transceiver 200 located at central office 102. Furthermore, the invention described hereafter is embodied in both DSL transceiver 200 located at central office 102 and in DSL transceiver 114 located at customer premises 108. However, for ease of illustration, only a single DSL transceiver 200 will be described below.

FIG. 1B is a graphical representation illustrating the frequency spectrum of the communication that occurs between central office 102 and customer premises 108 of FIG. 1A. The vertical axis of graph 120 represents transmission power and the horizontal axis of graph 120 represents frequency. Generally, the communication that occurs between DSL transceiver 200 and DSL transceiver 114 is divided by frequency, with the transmission from central office 102 toward customer premises 108 (downstream) occurring at a frequency higher than the transmission of information from DSL transceiver 114 located at customer premises 108 toward the DSL transceiver 200 located at central office 102 (upstream). For example, the curve indicated using reference numeral 122 represents upstream transmission from the customer premises 108 toward the central office 102, and the curve indicated using reference numeral 126 represents downstream transmission occurring from the central office 102 toward the customer premises 108. Transmission from the customer premises 108 toward the central office 102 is generally lower in frequency in order to avoid cross-talk that may occur as the signal gets nearer to the central office 102 and an increasing number of communication channels, such as channel 106, are bundled together in common cable bundles. Transmission from the central office 102 toward the customer premises 108 are subject to impairments caused by impulse noise generating elements, such as 60 Hz light dimmers and other low frequency, impulse generating elements. Furthermore, although shown as a discreet difference in frequencies indicated by region 124 in FIG. 1B, it is possible that there is some overlap occurring between the curves 122 and 126.

Further still, although shown as symmetric in nature for simplicity, the curves 122 and 126 may not appear identical. For example, the curve 122 might be higher in power and occur over a shorter frequency spectrum than curve 126.

The linear block interleaver (to be described below) included in the DSL transceivers 200 and 114 makes it possible for the receiver located in each transceiver to efficiently suppress or cancel this impulse noise and crosstalk generated in its vicinity and elsewhere in the communication system.

Figure 2:
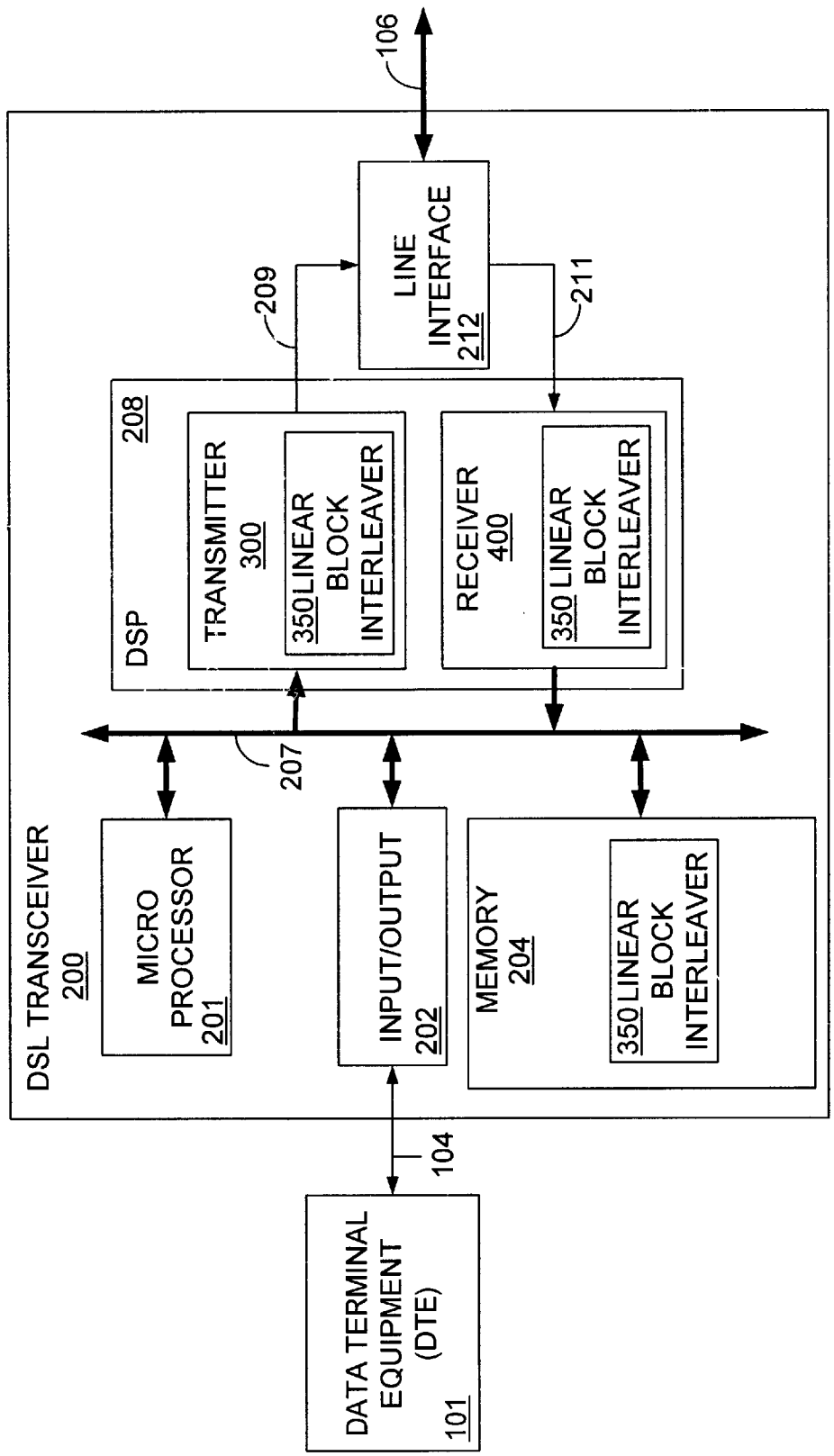
FIG. 2 is a block diagram illustrating the DSL transceiver of FIG. 1A.

FIG. 2 is a block diagram illustrating the DSL transceiver 200 of FIG. 1A. The DSL transceiver 200 communicates with DTE 101 via connection 104 where data supplied to and received from DTE 101 is exchanged via input/output element 202 within DSL transceiver 200. DSL transceiver 200 also includes microprocessor 201 and memory 204 in communication via bus 207 with digital signal processor (DSP) 208. DSP 208 includes the transmitter 300 and the receiver 400, each of which includes the linear block interleaver 350. Preferably, the linear block interleaver is program code that is stored in the memory 204 and executed in the DSP 208. Alternatively, the memory 204 and the microprocessor 201 may work in cooperation to store and execute the linear block interleaver logic 350 of the invention. Although DSP 208 as illustrated includes the transmitter 300 and receiver 400 of the invention, the transmitter 300 and receiver 400 may be implemented separately. The linear block interleaver 350 enables DSL transceiver 200 to reliably, economically and efficiently suppress or eliminate impulse noise generated in the vicinity of receiver 400 and elsewhere in the communication environment.

Transmitter 300 communicates via connection 209 with line interface 212 in order to gain access to communication channel 106. Similarly, receiver 400 receives signals from line interface 212 via connection 211.

Figure 3:
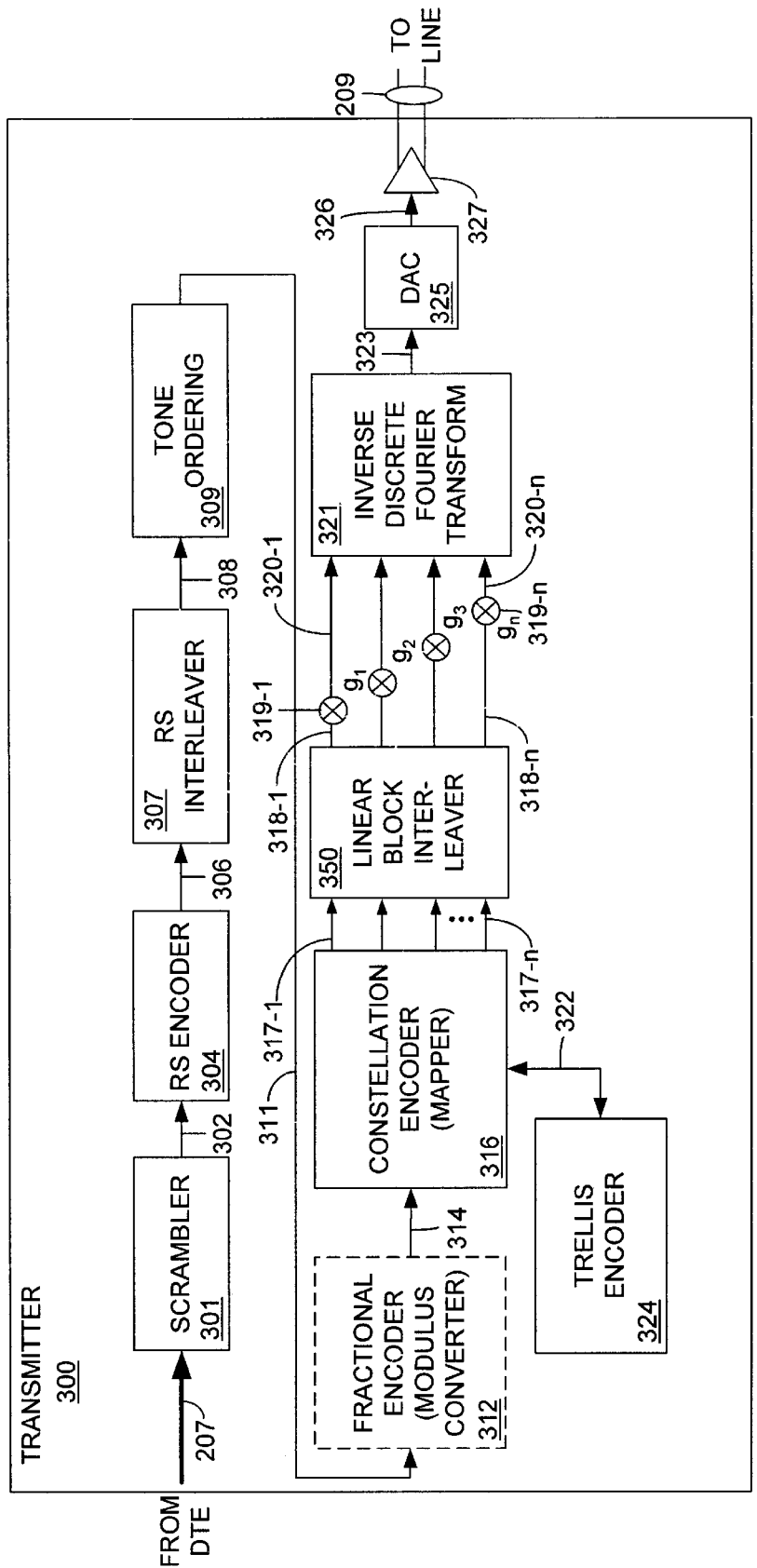
FIG. 3 is a block diagram illustrating the transmitter of FIG. 2.

FIG. 3 is a block diagram illustrating the transmitter 300 of FIG. 2. A data signal originating in DTE 101 is communicated via bus 207 to scrambler 301. The signal on connection 207 is in the form of a serial bit stream and the scrambler 301 provides a scrambled serial bit stream on connection 302. The scrambler 301 can be either a self-synchronized scrambler or a preset free running scrambler as is known in the art. Depending upon the application, the preset scrambler may have some advantages, as in the case where Reed-Solomon coding is used. The scrambler 301 provides a scrambled m bit word on connection 302 to the optional Reed-Solomon (RS) encoder 304. The optional RS encoder 304, if included, operates on the scrambled m bit word on connection 302 to provide forward error correction and provides the Reed-Solomon encoded serial bit stream including the RS encoded m bit words on connection 306. The RS encoded serial bit stream on connection 306 is operated on by RS interleaver 307 to provide an interleaved Reed-Solomon encoded serial bit stream on connection 308.

The serial bit stream on connection 308 is then supplied to tone-ordering element 309. Tone-ordering element 309 orders the groups of bits contained in the serial bit stream on connection 308 into words that are to be encoded for each signal space constellation. Essentially, the tone-ordering element 309 groups the serial bit stream into bit-wise words, which will be encoded on each tone of the DMT transmission system. The output of the tone-ordering element 309 could be serial or parallel. In this embodiment, serial words are preferred. The tone-ordering element 309 precedes the fractional encoder 312; however, the order of these elements may be reversed.

The serial words on connection 311 are then sent to fractional encoder 312. Fractional encoder 312 is optional and can be used to encode a fractional, or non-integer number of bits onto each tone of the DMT transmitter 300 in accordance with, that disclosed in commonly assigned, co-pending U.S. patent application Ser. No. 09/717,436, entitled "FRACTIONAL BIT RATE ENCODING IN A DISCRETE MULTI-TONE COMMUNICATION SYSTEM,". Fractional encoder 312, if included, includes the logic necessary to encode fractional bits onto each of the n tones in the DMT communication scheme. The fractional encoder 312 operates on groups of words to encode a fractional (i.e., non-integer) number of bits on each tone. The fractional encoder 312 generates n constellations for n carrier tones simultaneously, in order to add a fraction of a bit to each carrier tone.

If the fractional encoder 312 is used, the fractionally encoded bit stream is supplied via connection 314 to constellation encoder 316. If the fractional encoder 312 is omitted, the output of the tone-ordering element 309 is sent to the constellation encoder 316. The constellation encoder 316 encodes each word into a constellation for one carrier tone. Preferably, each word is mapped to a multi-dimensional circular signal space constellation. Circular signal space constellations are preferable because they allow an additional 0.2 dB of shaping gain, and an approximate 1.7 dB lower peak factor. Conventional DMT transmitters, by using square signal constellations, give up about 0.2 dB worth of shaping gain available through the use of circular signal space constellations. This is so due to the lower peak factor available through the use of circular signal space constellations. The advantage in channel capacity of fractional bit encoding is about 0.43 dB, deriving about 0.2 dB from circular constellations and about 0.23 dB from modulus conversion.

A trellis encoder 324 communicates via connection 322 with constellation encoder 316. The trellis encoder 324 operates sequentially on each word supplied via connection 314. The trellis encoder encodes from one tone to the next tone. Alternatively, a single carrier trellis encoder would encode from one symbol in time to the next symbol. Because DMT modulation is performed using discrete multiple carrier tones the trellis encoder encodes from one tone to the next tone.

The constellation encoder 316 supplies n constellations on n carrier tones represented using reference numerals 317-1 through 317-n. Although shown using only four tones in FIG. 3, typically, constellation encoder 316 would encode 256 individual carrier tones with the 256 encoded tones comprising an encoded symbol. The constellations represent one phase and amplitude for each tone in parallel. The constellation encoder 316 encodes each word into a signal space constellation to be transmitted by the DMT transmitter. The plurality of tones, each with its respective signal space constellation, comprises a symbol that is transmitted. Each of the individual carrier tones on connections 317-1 through 317-n is supplied to linear block interleaver 350. The linear block interleaver 350 (to be described in greater detail below) is applied between carrier tones (on connections 317-1 through 317-n). In this manner, the noise on any of the tones will be averaged across all the tones, thus suppressing impulse noise present at particular frequencies and also reducing added white gaussian (AWG) noise, while adding no delay to the transmit signal. The linear block interleaver 350 may also be applied between DMT symbol periods by combining respective tone constellations from two or more successive DMT symbol periods. This provides additional impulse noise suppression, but may add k-1 symbol periods of delay when k symbols are interleaved.

The output of the linear block interleaver 350 on connections 318-1 through 318-n correspond to the tones input on connections 317-1 through 317-n, but now the tones are interleaved. Each of the interleaved tones is supplied to a respective gain stage $g_i$ denoted by the reference numerals 319-1 through 319-n. The gain stages 319 ($g_i$) are part of a standard DMT transmitter and provide gain scaling for each of the transmitted tones.

The output of each gain scalar 319-1 through 319-n is supplied via connections 320-1 through 320-n to inverse discrete Fourier transform (IDFT) element 321. The IDFT element 321 transforms the set of all tones (in parallel or taken together at one time) into a sequence of tone samples that are serially output on connection 323. The output on connection 323 is supplied to digital-to-analog converter (DAC) 325. The DAC 325 converts the digital domain signals on connection 323 to the analog domain on connection 326. The analog signal on connection 326 is amplified by differential transmit amplifier 327, which is the line driver for the transmitter 300, for transmission via connection 209 to the line interface 212 of FIG. 2 for transmission via communication channel 106. DAC 325 may include a filter (not shown) to help control the power spectrum density (PSD) for spectrum management.

Figure 4:
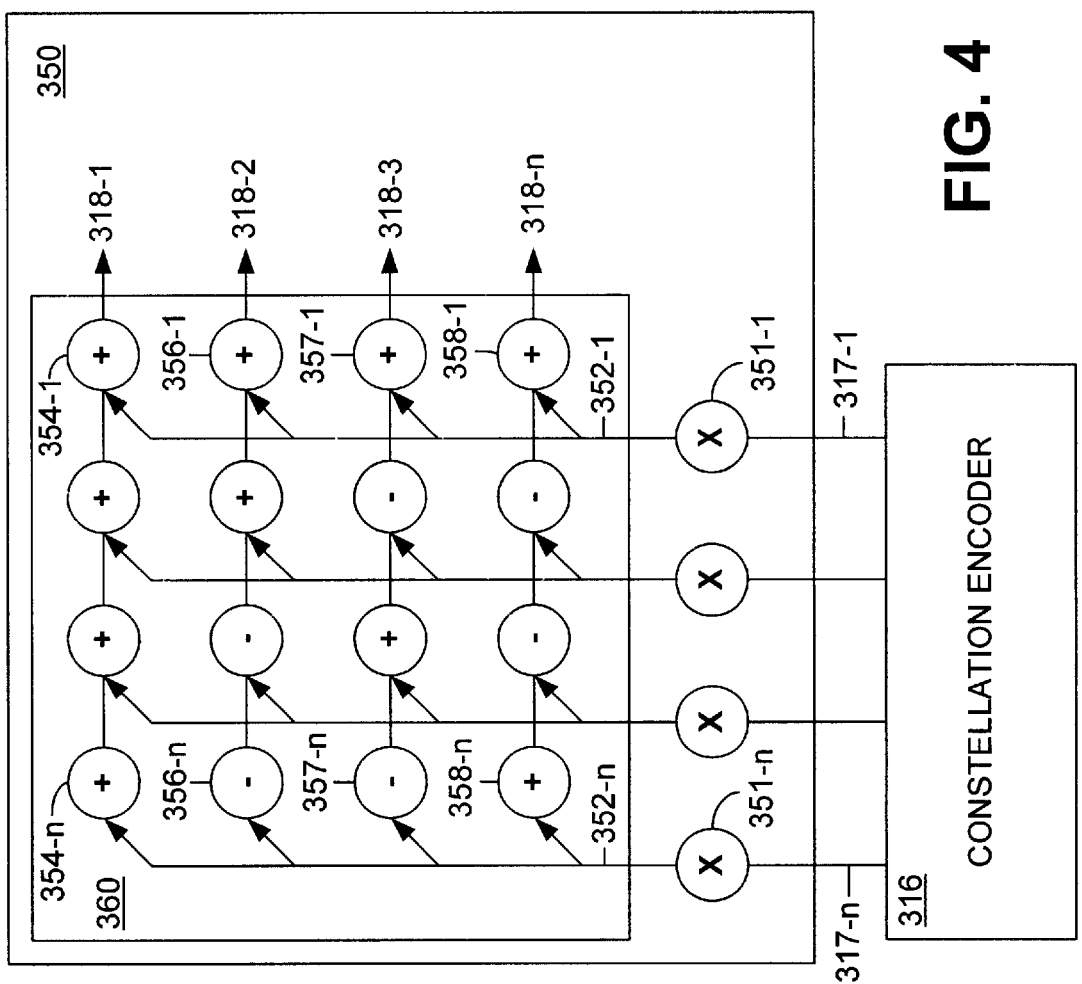
FIG. 4 is a block diagram illustrating the operation of the linear block interleaver of FIG. 3.

FIG. 4 is a block diagram illustrating the operation of the linear block interleaver 350 of FIG. 3. Linear block interleaver 350 contains selective sum device 360. Selective sum device 360 contains an array of arithmetic operators 354-1 through 354-n, 356-1 through 356-n, 357-1 through 357-n, and 358-1 through 358-n, which selectively sum the values of the tones supplied on connections 352-1 through 352-n, respectively, according the linear block interleaver equations mentioned below.

Illustratively, the constellation encoder 316 supplies the individual encoded tones over connections 317-1 through 317-n to respective scalars 351-1 through 351-n. The scalars 351 provide a "divide by two" or "square root of four" function, because in this example, four independent tones are being summed in the linear block interleaver 350. It should be mentioned that typically, a total of 256 tones are generated in a DMT modulator. Therefore, the linear block interleaver 350 may operate on up to 256 tones. Furthermore, it is possible for the linear block interleaver to operate on as many tones as are transmitted. Furthermore, multiple tones can be combined into symbol blocks and the linear block interleaver 350 may interleave from symbol to symbol. However, depending on the application, more or fewer tones may be generated by the DMT modulator and operated on by the linear block interleaver 350.

The scalars 351 scale the x component of the complex vector on connections 317-1 through 317-n by a factor of $n^{-1/2}$ (square root of $1/n$) and then supply the x component on connections 352-1 through 352-n. In some applications each of the scalars 351-1 through 351-n may have different gain factors from one another. Scaling at the input to selective sum device 360 reduces the dynamic range of the input signal, which can reduce the complexity of the mathematical logic. Alternatively, the x component may be scaled within or at the output of selective sum device 360.

The scaled tones are supplied on lines 352-1 through 352-n to selective sum device 360. For example, arithmetic operators 354-1 through 354-n are adders, which add the four tones contained on connections 352-1 through 352-n according to the first x interleave equation below. Similarly, arithmetic operators 356-1 through 356-n, (where 356-1 and 356-2 are adders and 356-3 and 356-n are subtractors) operate on the tones on connections 352-1 through 352-n in accordance with the second x interleave equation below. Similarly, arithmetic operators 357-1 through 357-n and arithmetic operators 358-1 through 358-n operate on the tones on connections 352-1 through 352-n in accordance with the third and fourth x interleave equations, respectively. In this manner all tones provided by constellation encoder 316 are interleaved. This process is repeated independently for the y components and for higher dimensions. In a more general application, the linear block interleaver 350 may operate across multiple dimensions and the x and y components may be interleaved together. Simply stated, the linear block interleaver 350 mathematically combines multiple tones from a signaling constellation into a block of n-tone combinations such that energy from each original tone is transmitted in all n-tone combinations of the n-tone block. As will be discussed with respect to FIG. 5, the receiver 400 mathematically combines the received n-tone combinations to recover the original independent tones.

For example, in the case of n=2, tones A and B which were to be transmitted as first tone A and second tone B, are transmitted as first tone A'=0.707(A+B) and second tone B'=0.707(A−B). The receiver, after receiving both tones recovers the original symbols by combining A=0.707(A'+B') and B=0.707(A'−B'). This operation beneficially reduces the magnitude of any impulse noise by spreading the impulse energy over all n-tones reducing the impulse by $10*\log(n)$ dB or 3 dB in the case of n=2. If A' is received with impulse I as (A'+I) then the recovered symbols will be (A+0.707*I) and (B+0.707*I). The impulse is attenuated by a factor of 0.707 or 3 dB. In this manner, the invention suppresses noise in a DMT transceiver by combining multiple signal constellations into n-tone combinations and transmitting the n-tone combinations to a receiver. The receiver receives the n-tone combinations and combines them in order to recover each of the signal constellations. When used with trellis coding it is preferred that the block size n be larger than the constraint length of the trellis code.

The linear block interleaver 350, when used in combination with the DMT gain scalars 319 ($g_i$), will suppress impulses or correlated noise. It can also augment or replace the function of the gain scalars 319 ($g_i$), by averaging the root mean square (RMS) noise of multiple tones to achieve the same performance, but with constant transmit PSD, avoiding the need to increase the power of some tones by as much as 2.5 dB. Consider the case of two tones A and B, which have a signal-to-noise ratio (SNR) sufficient to transmit two constellations having 91 and 182 points, respectively. Using the fractional encoder, these tones carry 6.51 bits and 7.51 bits of information for a total capacity of 14 bits. Conventional DMT would boost the power of tone A by the square root of 128/91 and attenuate tone B by the square root of 128/182 allowing the transmission of 7 bits via a 128 point constellation on both tones. This strategy fails in this case because the total average power becomes (128/91+128/182)/2=1.055, which is 0.23 dB too high. In this case the linear block interleaver 350 provides impulse protection but no RMS advantage because the tone powers have been normalized by the gain scalars 319 ($g_i$) yielding equal noise on both tones. The boost of tone A power increases the PSD of tone A by $10*\log(128/91)$=1.48 dB, which is undesirable. If the gain scalars 319 ($g_i$) are kept constant at unity, then the linear block interleaver 350 will average the noise on both tones, yielding an average noise of $n^2$ equal to (1/91+1/182)/2=1/121.3. This is sufficient to carry 6.92 bits. This capacity of 6.92 bits falls 0.08 bits or 0.23 dB short of that needed for 7 bits per symbol. The linear block interleaver 350 has achieved the same RMS performance as conventional DMT gain scaling, with the advantage of impulse suppression and without boosting the power of any tones.

The 4-symbol block interleaver equations are as follows. The same equations that are used in the transmitter for interleaving are used in the receiver for de-interleaving. Both x and y coordinates of each constellation point of each tone are independently interleaved. All tones may be arithmetically combined into all n-tones of a symbol block. A larger block provides greater impulse compression and protects against correlated noise or impulses that span multiple tones. A variation allows only subgroups of tones to be arithmetically combined and then the subgroups are interleaved over the entire block. This variation provides the same frequency spread of an impulse that spans multiple tones but has the advantage of a lower peak signal power, lower delay before error signals are available for adaptive algorithms or decision feedback equalizers, and lower burst processing cycle time. This method may be preferred to combine tones with common modulus or common constellation size in the same interleaver block.

The interleaver equations include a gain factor of $n^{-1/2}$ (square root of 1/n) or $10*\log(n)$ or $-10*\log(n)$ dB to maintain nominal power. The following equations are examples of a 4-tone linear block interleaver.

x=(iLBIx[0]+iLBIx[1]+iLBIx[2]+iLBIx[3])*0.5;
y=(iLBIy[0]+iLBIy[1]+iLBIy[2]+iLBIy[3])*0.5;
iLBIx[4]=(iLBIx[0]+iLBIx[1]−iLBIx[2]−iLBIx[3])*0.5;
iLBIy[4]=(iLBIy[0]+iLBIy[1]−iLBIy[2]−iLBIy[3])*0.5;
iLBIx[5]=(iLBIx[0]−iLBIx[1]+iLBIx[2]−iLBIx[3])*0.5;
iLBIy[5]=(iLBIy[0]−iLBIy[1]+iLBIy[2]−iLBIy[3])*0.5;
iLBIx[6]=(iLBIx[0]−iLBIx[1]−iLBIx[2]+iLBIx[3])*0.5;
iLBIy[6]=(iLBIy[0]−iLBIy[1]−iLBIy[2]+iLBIy[3])*0.5;

The buffered input tones are iLBIx[0–3] and iLBIy[0–3]. The interleaved output samples are x and y for the first tone. Then iLBIx[4–6] and iLBIy[4–6] are buffered outputs for the last 3 tones of the block.

Figure 5:
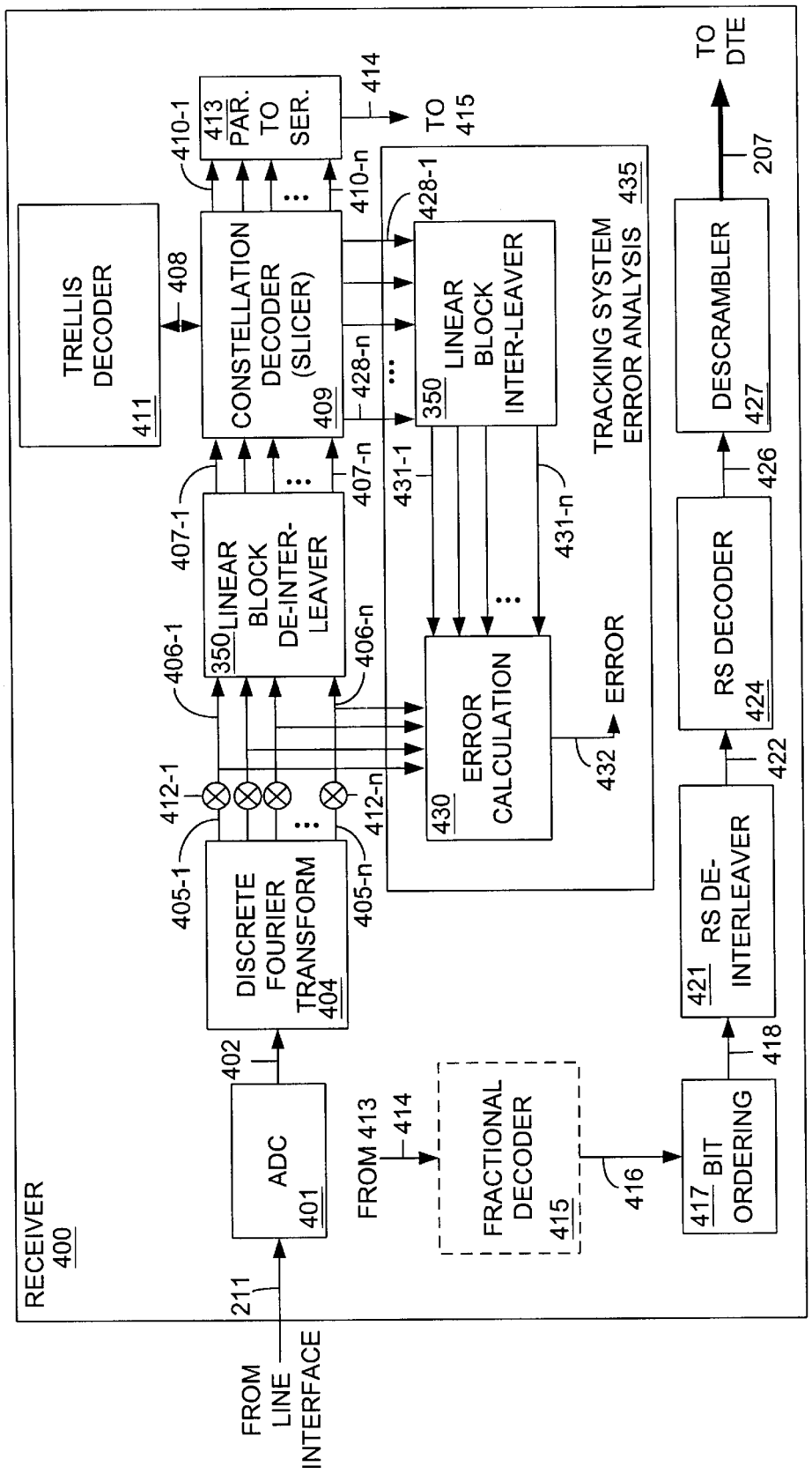
FIG. 5 is a block diagram illustrating the receiver of FIG. 2.

While not illustrated in the preferred embodiment, the set of equations for a 2-tone block interleaver are as follows:

x=(iLBIx[0]+iLBIx[1])*0.707;
y=(iLBIy[0]+iLBIy[1])*0.707;
iLBIx[4]=(iLBIx[0]−iLBIx[1])*0.707;
iLBIy[4]=(iLBIy[0]−iLBIy[1])*0.707; and the set of equations for 2 interleaved 2-tone blocks are as follows:
x=(iLBIx[0]+iLBIx[1])*0.707;
y=(iLBIy[0]+iLBIy[1])*0.707;
iLBIx[4]=(iLBIx[2]+iLBIx[3])*0.707;
iLBIy[4]=(iLBIy[2]+iLBIy[3])*0.707;
iLBIx[5]=(iLBIx[0]−iLBIx[1])*0.707;
ILBly[5]=(iLBIy[0]−iLBIy[1])*0.707;
iLBIx[6]=(iLBIx[2]−iLBIx[3])*0.707;
iLBIy[6]=(iLBIy[2]−iLBIy[3])*0.707;

FIG. 5 is a block diagram illustrating the receiver 400 of FIG. 2. A signal received on communication channel 106 is supplied via line interface 212 (FIG. 2) via connection 211 to analog-to-digital converter (ADC) 401. ADC 401 may include a filter (not shown) and/or equalizer (not shown) to help control undesirable signals and intersymbol interference. ADC 401 converts the analog signal received on connection 211 into a serial bit stream of time domain samples on connection 402. The serial bit stream on connection 402 is supplied to discrete Fourier transform (DFT) element 404. The DFT element 404 transforms the tone sequence of samples on connection 402 into a plurality of individual interleaved tones represented using reference numerals 405-1 through 405-n. Each of the tones on connections 405-1 through 405-n are supplied to a scalar $1/g_i$ 412-1 through 412-n, respectively, each of which performs the inverse operation of the scalar 319-1 through 319-n. The output of each scalar 412 is supplied as interleaved tones on connections 406-1 through 406-n. DFT 404 may include adaptive phase and/or amplitude tracking for each tone. System timing may be recovered in DFT 404 by correlating phase changes on one pilot tone or across multiple tones. This is facilitated by the tracking system error analysis element 435 (described in greater detail below). The interleaved tones on connections 406-1 through 406-n correspond to the tones 318-1 through 318-n of FIG. 3. The interleaved tones on connections 406-1 through 406-n comprise a symbol encoded in a circular signal space constellation.

Each of the interleaved tones 406-1 through 406-n are supplied to the linear block de-interleaver 350 and to error calculation element 430. By performing the same calculations as performed in the transmitter, the linear block de-interleaver 350 de-interleaver interleaves the tones on connections 406-1 through 406-n and supplies the de-interleaved tones on connections 407-1 through 407-n to the constellation decoder 409. The constellation decoder 409 outputs on connections 410-1 through 410-n an index representing the constellation point received for each of the tones. Each of the tones on connections 410-1 through 410-n are supplied to a parallel-to-serial converter 413, which converts the parallel tones into a serial stream on connection 414. Trellis decoder 411 communicates with constellation decoder 409 via connection 408.

The constellation decoder 409 also supplies an ideal reference signal for each of the tones on connections 428-1 through 428-n. Alternatively, only tones that occur at particular frequencies of interest may be supplied on connections 428-1 through 428-n. For example, for tracking timing, only one or two tones may be supplied from the constellation decoder 409 to the linear block de-interleaver 350 via connections 428-1 through 428-n. These ideal reference signals are vectors that represent the ideal x and y values for the signal on each tone. The ideal reference signals are re-interleaved by linear block de-interleaver 350 and supplied as interleaved ideal reference signals via connections 431-1 through 431-n to error calculation element 430. For tracking timing only one or two tones may be re-interleaved by linear block interleaver 350 and supplied to error calculation element 430. The error calculation element 430 compares the phase angle of each interleaved tone on connections 406-1 through 406-n with the phase angle of each interleaved ideal reference tone on connections 431-1 through 431-n, respectively. By comparing the phase of the interleaved tones on connections 406-1 through 406-n with the phase of the ideal reference tones on connections 431-1 through 431-n, respectively, the error calculation element 430 generates an error signal ($\phi e$) on connection 432. The error signal on connection 432 can be used to track timing, determine phase changes and determine gain changes in the transmission channel.

The serial group of indices on connection 414 is supplied from the parallel-to-serial converter 413 to optional fractional decoder 415. The fractional decoder 415, if present, converts the groups of indices, or words, into a new set of binary words, which are restored in their original order. The optional fractional decoder 415 supplies the serial words via connection 416 to bit ordering element 417. If the fractional decoder 415 is omitted, the parallel-to-serial converter 413 supplies the serial words on connection 414 directly to the bit-ordering element 417. The bit ordering element 417 orders the bits into their original order and supplies the serial stream on connection 418 to RS de-interleaver 421, which de-interleaves the Reed-Solomon encoded bit stream. The de-interleaved bit stream is supplied on connection 422 to RS decoder 424. RS decoder 424 removes the Reed-Solomon forward error correction and supplies the scrambled bit stream via connection 426 to descrambler 427. Descrambler 427 descrambles the serial bit stream and supplies the original bit stream via connection 207 through the input/output element 202 (FIG. 2) and to DTE 101.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

Therefore the following is claimed:

1. A system for noise suppression in a discrete multi-tone (DMT) transceiver, comprising:
   a linear block interleaver configured to mathematically combine multiple constellations into a block of n-tone combinations wherein noise energy from at least one of the multiple constellations is spread among the block of n-tone combinations; and
   a DMT transmitter configured to transmit the combinations as a transmit signal.

2. The system of claim 1, further comprising a receiver configured to receive the transmit signal, where the receiver includes a linear block de-interleaver and the linear block de-interleaver combines the block of n-tone combinations in order to recover each of the multiple constellations.

3. The system of claim 1, further comprising a scalar associated with each of the multiple constellations, the scalar configured to attenuate each of the multiple constellations by an attenuation factor.

4. The system of claim 1, wherein the linear block interleaver includes logic configured to mathematically combine a first constellation and a second constellation into a combined first and second signal and the transmitter transmits the combined signal.

5. The system of claim 2, wherein the linear block interleaver re-interleaves said block of n-tone combinations, and further comprising:
   an error calculation element configured to generate an error signal using said re-interleaved combinations, wherein said error signal is used to update adaptive algorithms.

6. A method for suppressing noise in a discrete multi-tone (DMT) transceiver, the method comprising the steps of:
   combining multiple signal constellations, each constellation associated with a carrier tone, into a plurality of n-tone combinations, wherein noise energy present in at least one of the constellations is spread among each of the multiple n-tone combinations; and
   transmitting the n-tone combinations to a receiver.

7. The method of claim 6, further comprising the steps of:
   receiving the n-tone combinations; and
   combining the n-tone combinations in order to recover each of the signal constellations.

8. The method of claim 6, further comprising
the step of attenuating each of the multiple constellations by an attenuation factor.

9. The method of claim 6, wherein the step of combining multiple signal constellations, further comprises the steps of:
mathematically combining a first tone and a second tone to obtain a first prime tone; and
mathematically combining the first tone and the second tone to obtain a second prime tone.

10. A method for suppressing noise in a discrete multi-tone (DMT) transceiver, the method comprising the steps of:
combining multiple signal constellations into n-tone combinations, wherein noise energy present in at least one of the constellations is spread among each of the n-tone combinations;
transmitting the n-tone combinations to a receiver;
receiving the n-tone combinations; and
combining the n-tone combinations in order to recover each of the signal constellations, wherein the step of combining the n-tone combinations, further comprises the steps of:
mathematically combining a first prime tone and a second prime tone to obtain a first symbol; and
mathematically combining the first prime tone and the second prime tone to obtain a second symbol.

11. The method of claim 7, further comprising the step of re-interleaving the n-tone combinations in order to generate an error signal used to update adaptive algorithms.

12. A system for suppressing noise in a discrete multi-tone (DMT) transceiver, comprising:
means for combining multiple signal constellations into a plurality of n-tone combinations, wherein noise energy present is at least one of the signal constellations is spread among each of the plurality of n-tone combinations; and
means for transmitting the n-tone combinations to a receiver.

13. The system of claim 12, further comprising:
means for receiving the n-tone combinations; and
means for combining the n-tone combinations in order to recover each of the signal constellations.

14. The system of claim 12, further comprising means for attenuating each of the multiple constellations by an attenuation factor.

15. The system of claim 12, wherein the means for combining multiple signal constellations, further comprises:
means for mathematically combining a first tone and a second tone to obtain a first prime tone; and
means for mathematically combining the first tone and the second tone to obtain a second prime tone.

16. A system for suppressing noise in a discrete multi-tone (DMT) transceiver, comprising:
means for combining multiple signal constellations into a plurality of n-tone combinations, wherein noise energy present in at least one of the constellations is spread among each of the plurality of n-tone combinations;
means for transmitting the n-tone combinations to a receiver;
means for receiving the n-tone combinations; and
means for combining the n-tone combinations in order to recover each of the signal constellations,
wherein the means for combining the n-tone combinations, further comprises:
means for mathematically combining a first prime tone and a second prime tone to obtain a first symbol; and
means for mathematically combining the first prime tone and the second prime tone to obtain a second symbol.

17. The system of claim 13, further comprising means for re-interleaving the n-tone combinations in order to generate an error signal used to update adaptive algorithms.

18. The system of claim 1, wherein the multiple constellations comprises N input constellations, wherein the block of n-tone combinations comprises N output combinations, where each of said N output combinations contains a weighted sample of all of said N input constellations, where the transmitter transmits the combinations as a transmit signal.

19. The system of claim 2, where the linear block interleaver performs a first mathematical operation, and the linear block de-interleaver performs a second mathematical operation, the first and second mathematical operations being equivalent.

* * * * *